Sept. 21, 1965     K. M. HART ETAL     3,206,830
METHOD FOR MAKING SLEEVE BEARINGS
Filed July 20, 1962                    6 Sheets-Sheet 4
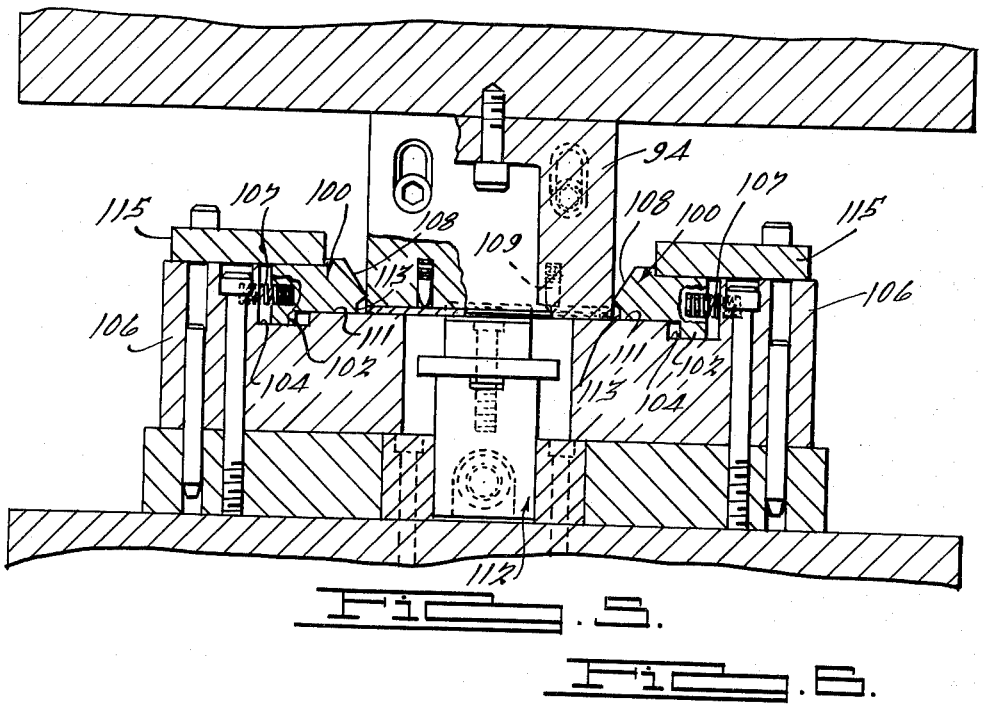
FIG. 5.
FIG. 6.
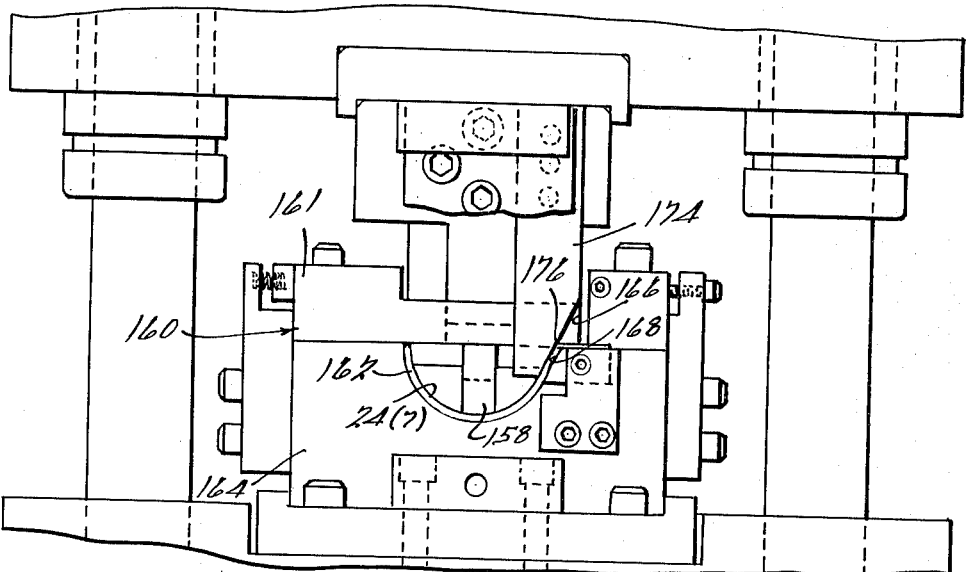
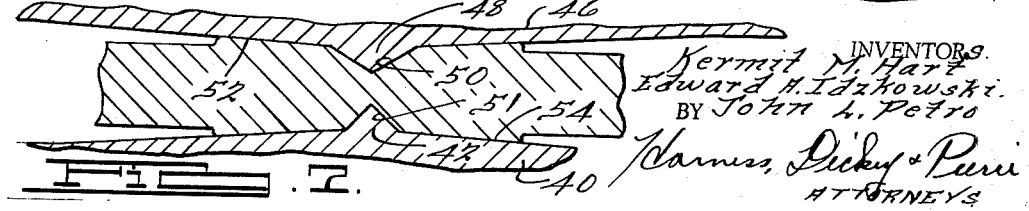
FIG. 7.
INVENTORS.
Kermit M. Hart
Edward A. Idzkowski
BY John L. Petro
Harness, Dickey & Pierce
ATTORNEYS INVENTORS.
Kermit M. Hart
Edward A. Idzkowski
BY John L. Petro
Carnes, Dickey & Pierce
ATTORNEYS

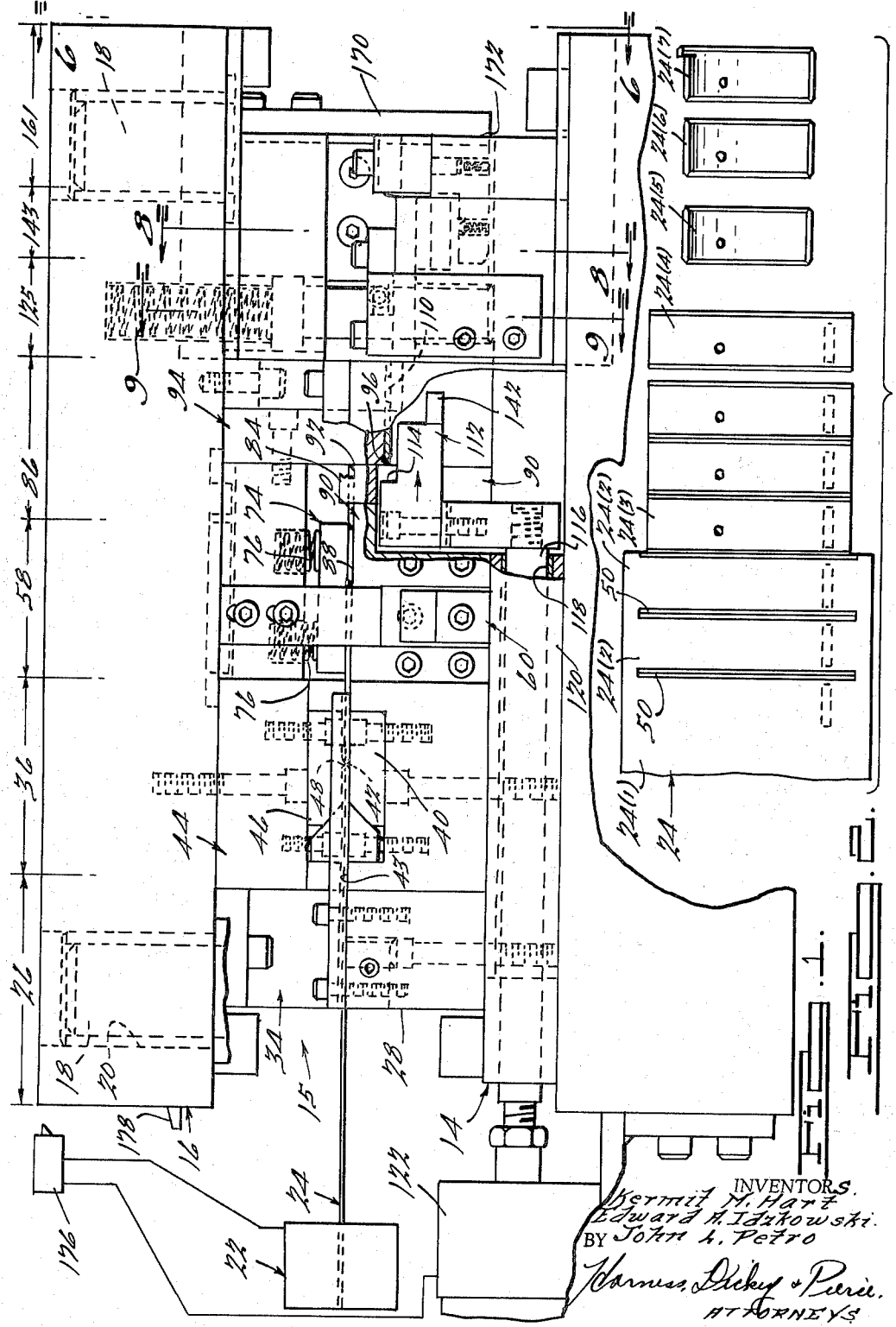

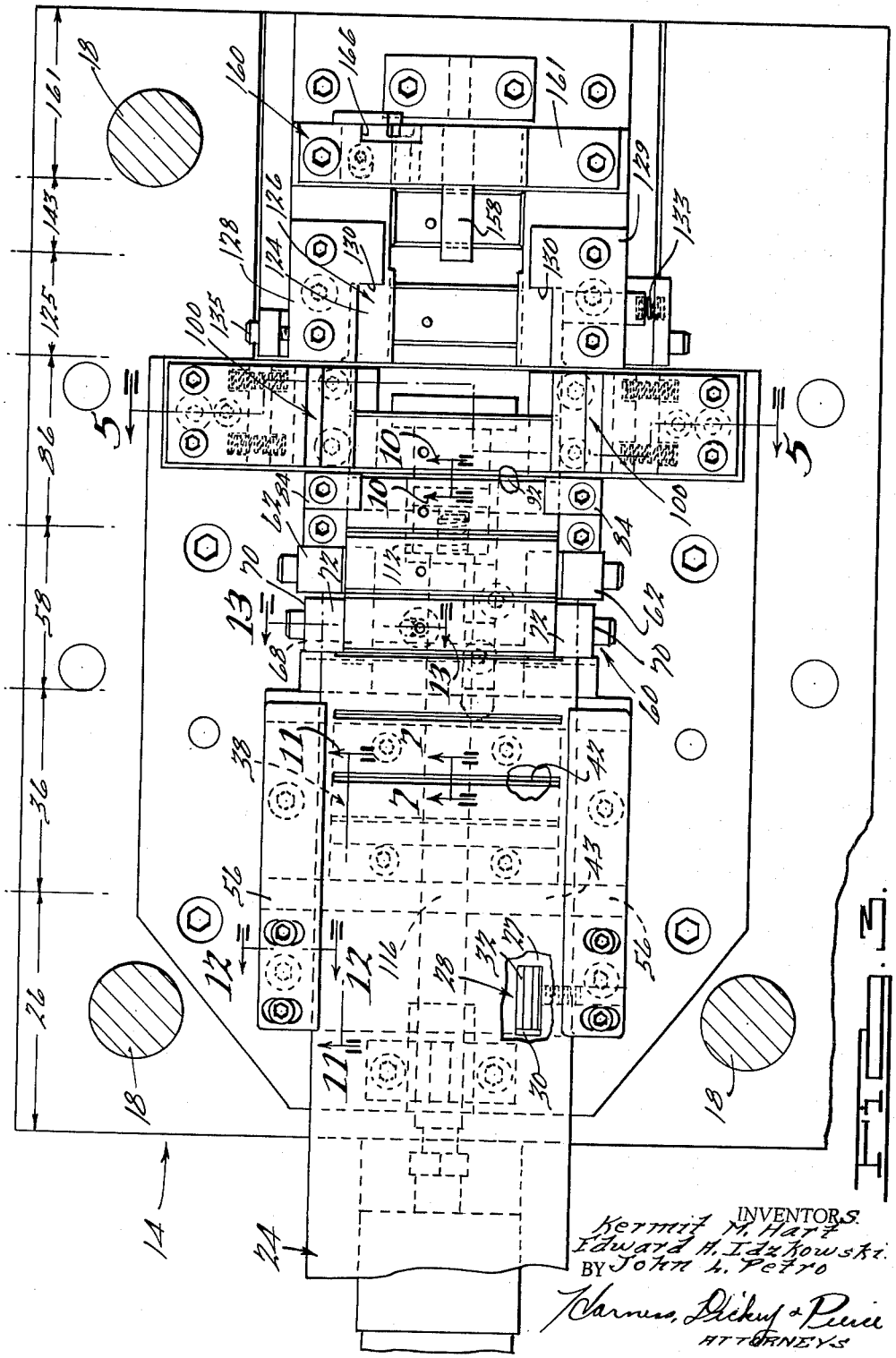

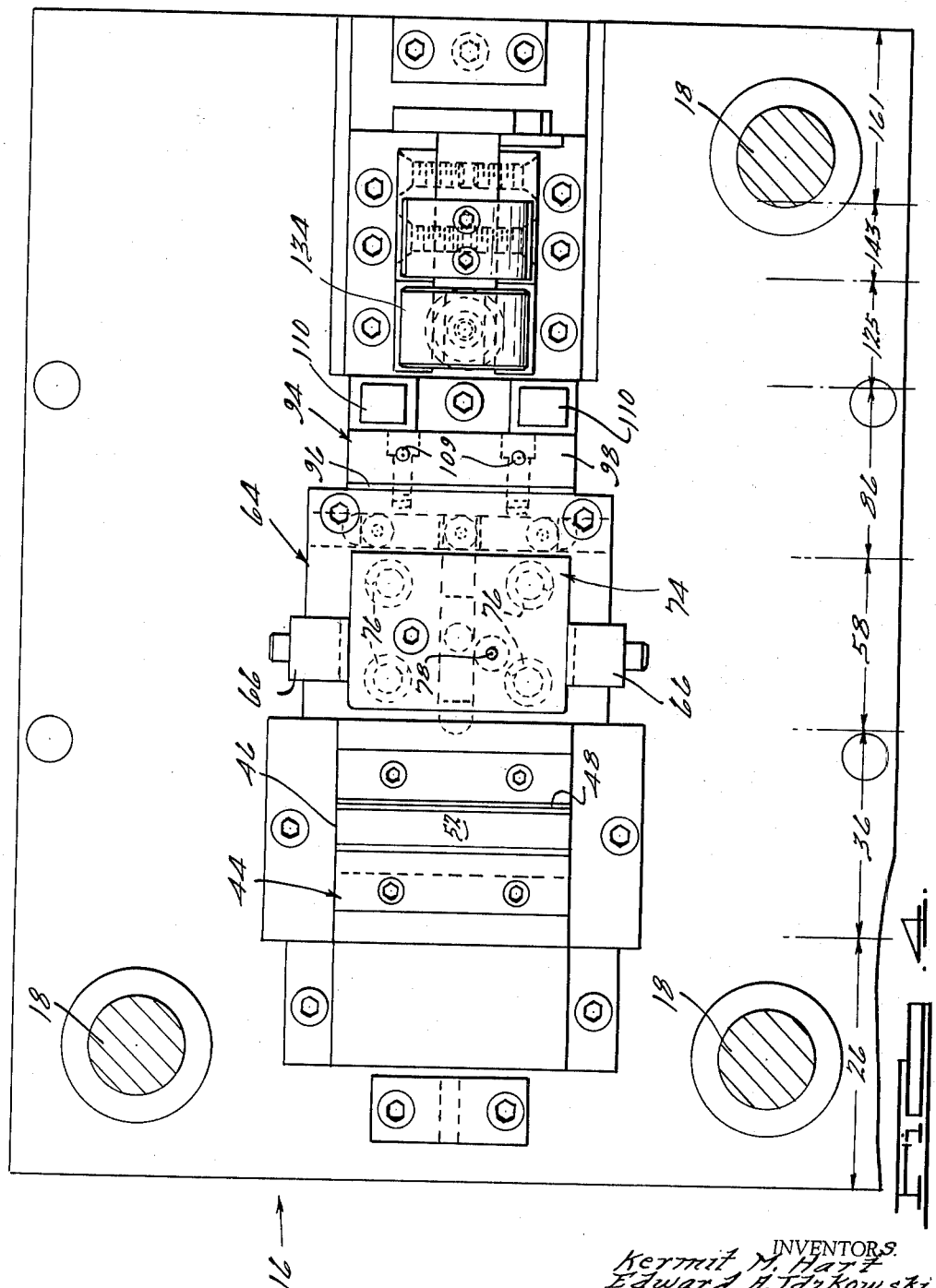

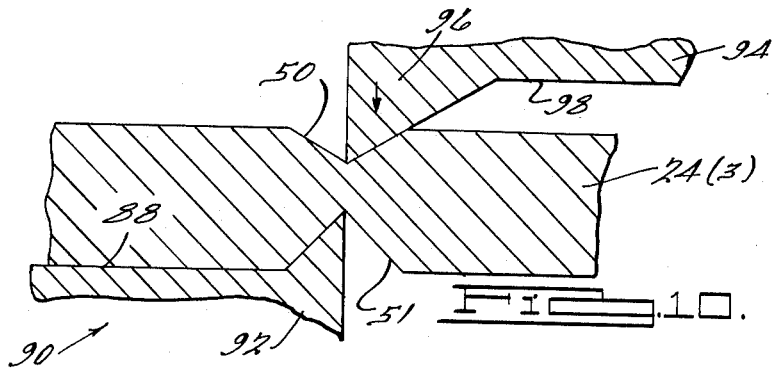
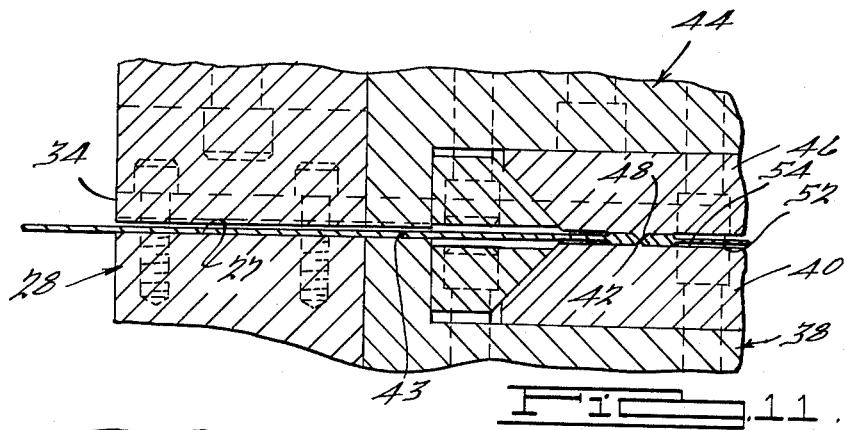
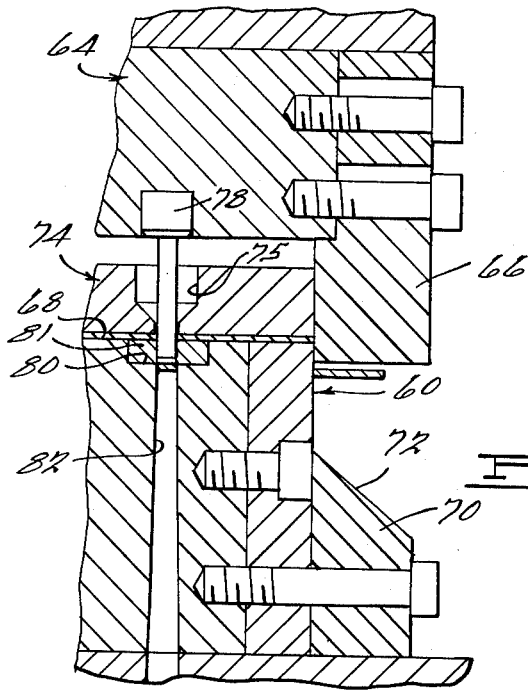
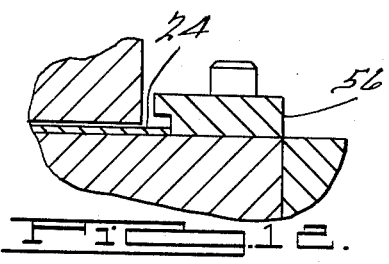

3,206,830
METHOD FOR MAKING SLEEVE BEARINGS
Kermit M. Hart, Edward A. Idzkowski, and John L. Petro, St. Johns, Mich., assignors to Federal-Mogul-Bower Bearings, Inc., Detroit, Mich., a corporation of Michigan
Filed July 20, 1962, Ser. No. 211,162
10 Claims. (Cl. 29—149.5)

This invention relates to a method and apparatus for making sleeve bearings.

Sleeve bearings or bearing inserts have many applications with some of the most extensive being in the automotive industry for use on connecting rods, etc. The sleeve bearings are conventionally made of a bimetallic material such as steel backed Babbitt, aluminum, copper, lead, or bronze, or of any other suitable bearing material and are formed in a semicircular shape.

In the sleeve bearing industry it is a common practice to manufacture sleeve bearings in a series of machining and forming operations with the bearings being either manually or mechanically transferred from one operation at one location to a next at a different location. The bearing must be precisely positioned at each stage or location prior to the operation to be performed, since any misalignment results in improper machining or forming of the part hence usually requiring that that part be scrapped. The more stages at different locations to which the bearing must be transferred simply provides that many more opportunities for misalignment, etc., resulting in scrap. It is an object of this invention to provide a novel method for producing sleeve bearings in which the number of separated stages to which the bearing is transferred during fabrication is substantially reduced.

In the automotive industry millions of sleeve bearings are required annually; therefore, any reduction in the amount of material used to form each bearing shell results in significant savings. In the present invention each blank is initially formed to substantially the final bearing width, thus allowing more bearings to be made from a given amount of material.

It is an object of this invention to provide a novel method for producing sleeve bearings in which the amount of material from which each bearing shell is formed is minimized.

It is a general object of the present invention to provide an improved method for making sleeve bearings.

Other objects, features, and advantages of the present invention will become apparent from the subsequent description and the appended claims, taken in conjunction with the accompanying drawings, in which:

FIGURE 1 is a side elevational view with some parts shown broken away and some parts shown in section, depicting a construction of a multiple stage die for making sleeve bearings from a strip of bearing material and embodying the features of this invention;

FIGURE 2 is a top elevational view depicting a bearing sleeve at various stages in the die of FIGURE 1 in its formation from a strip of bearing material;

FIGURE 3 is a top elevational view of the lower section of the multiple stage die shown in FIGURE 1;

FIGURE 4 is a bottom elevational view of the upper section of the multiple stage die shown in FIGURE 1;

FIGURE 5 is a sectional view of the multiple stage die of FIGURE 1 taken substantially along the line 5—5 in FIGURE 3;

FIGURE 6 is an end view of the multiple stage die of FIGURE 1 taken substantially along the line 6—6 in FIGURE 1;

FIGURE 7 is a fragmentary, blown up sectional view of the upper and lower die sections as taken along the line 7—7 in FIGURE 3;

FIGURE 10 is a fragmentary, sectional blown up view of the upper and lower die sections as taken along the line 10—10 in FIGURE 3;

FIGURE 11 is a fragmentary, sectional blown up view of the upper and lower die sections as taken along the line 11—11 in FIGURE 3;

FIGURE 12 is a fragmentary, sectional blown up view of the upper and lower die sections as taken along the line 12—12 in FIGURE 3; and FIGURE 13 is a fragmentary, sectional blown up view of the upper and lower die sections as taken along the line 13—13 in FIGURE 3.

Figure 8:
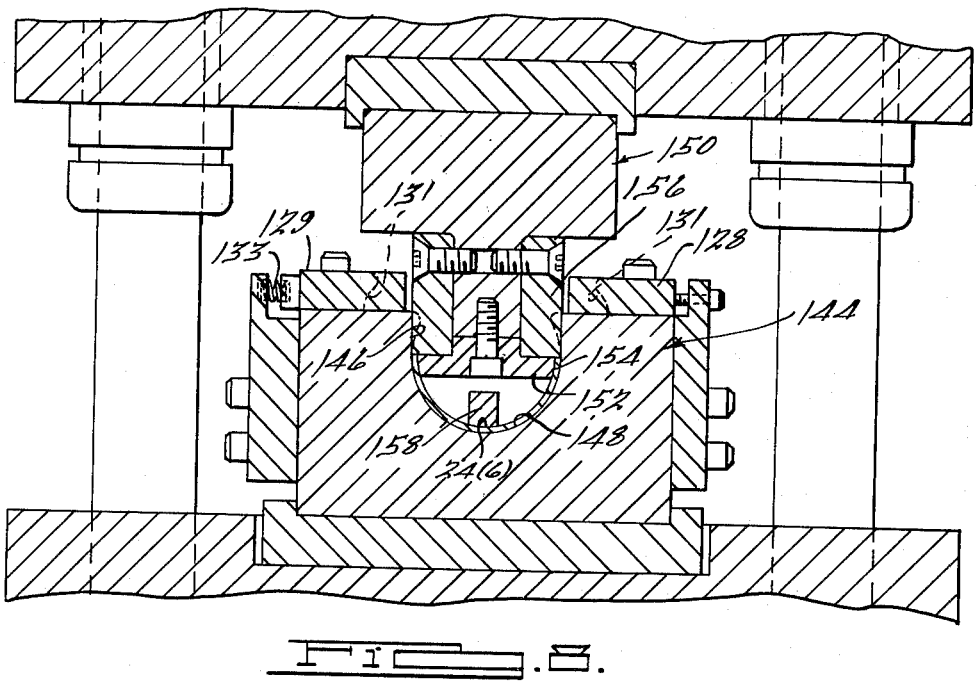
FIGURE 8 is a sectional view of the multiple stage die of FIGURE 1 taken substantially along the line 8—8 in FIGURE 1.

In general, the multiple stage die of this invention operates on a continuous basis with a bimetallic strip of bearing material being continuously fed into the die at one end and with semifinished sleeve bearings being ejected from the other end. The initial operations are performed with the blank attached to or integral with the strip of bearing material while the remaining operations are performed on a free blank. The die comprises in general seven stages; in the first stage, secured blanks of the strip material are consecutively stamped with the part number, trademark, etc. At the second stage, the inside diameter and outside diameter chamfers are consecutively formed for each secured blank. At the third stage, the secured blanks are consecutively trimmed to the proper length and a hole, groove or slot can be pierced or coined therein which hole is commonly used as an oil or dowel hole; at the fourth stage, each secured blank is sheared along the chamfer line to form a free blank of the proper width. In the fifth stage, the free blank is formed into a substantially semicircular shape while in the sixth stage the height and diameter of the formed bearing strip is coined. In the final and seventh stage, a locating lip is formed on the now substantially semicircularly shaped sleeve bearing. The sleeve bearings ejected from the multiple stage die can be machined on their radially inner surfaces to a high finish; finally, the ends are machined to the correct height, resulting in a finished product.

Looking now to FIGURE 1, a multiple stage die 15 is comprised of a fixed lower die section 14 and an upper die section 16, which is movable relative to the lower section 14 along three guide rods 18 which are fixed to and spaced on the lower die section 14. The guide rods 18 are matably, slidably disposed within three sleeved bores 20 located in the upper section 16, whereby the upper section 16 can be caused to move axially along the rods 18 by hydraulic, pneumatic, electric or other means (not shown) well known in the art.

A bearing strip feeding mechanism 22, shown in block form in FIGURE 1, is utilized to automatically feed a strip 24 of bearing material into the die 15; the bearing strip 24 can be formed of any conventional bearing material such as aluminum or Babbitt on steel. The feed mechanism 22 is time-sequenced by means to be described in conjunction with the raising and lowering of the upper die section 16 such as to automatically, intermittently feed a portion of the strip 24 into the multiple stage die assembly 15. The condition of the strip of bearing material 24, as it progresses through the multiple stage die 15 and as it is formed in the various stages, can be seen in FIGURE 2; the numerals 24(1)-24(7) depict the condition of the bearing strip 24 after the completion of the operation at each of the seven stages. Note that through the first three stages the operations are performed on blanks integral with or secured to the strip 24 and that after the fourth stage the operations are performed on a free blank. The operations at all seven stages, whether on the integral strip 24 or on a free blank, are performed substantially simultaneously as the upper die section 16 moves toward the lower die section 14.

*Stage I.—Part number and trademark stamp*

In the first stage, generally indicated by the numeral 26, of the multiple die assembly 15, the bearing strip material 24 (FIGURE 3) is passed over the relatively flat upper surface 27 of a lower block member 28 (FIGURES 3 and 11) which has a rectangular slot 30 near one end in which is secured a stamping die 32 which projects slightly above the surface 27. Secured to the upper die section 16, in vertical alignment with the flat block member 28 is an upper block member 34 which upon lowering the upper die section 16 is engageable with the upper surface of the strip material 24 thereby pressing that material against the lower block member 28 and against the stamping die 32, thereby forming on the lower surface of the strip 24 the impression of the part number, trademark and/or other pertinent information contained on the stamp die 32. The bearing strip 24 is intermittently fed longitudinally into the multiple stage die 15 after each actuation of the upper die section 16 a predetermined amount corresponding to the width of each bearing shell. Thus the feed mechanism 22 automatically causes the strip 24 to be indexed in the die 15, thereby continuously presenting to the part number and trademark stamp stage a new surface to be marked.

Looking now to FIGURE 2, the secured blank portion 24(1) of strip 24 depicts the condition of that portion of strip 24 after completion of the operation at the first stage.

*Stage II.—Formation of inside diameter and outside diameter chamfers*

The second stage of the multiple stage die assembly 15 is indicated by the numeral 36. A lower scoring die assembly 38 (FIGURES 1, 3, 7 and 11) is fixed to the lower die section 14 and has secured in a slot in its upper surface 43 a removable lower scoring die 40 which extends transversely of the die 15 for a length greater than the final length of the bearing sleeve, as will later be seen, and which has extending upwardly therefrom on inverted V-shaped scoring knife-edge 42. The knife-edge 42 extends above the substantially flat upper surface 43 of assembly 38 which is substantially in the same plane as the surface 27 of the lower stamp block member 28. An upper scoring die assembly 44 is secured to the upper die section 16 and includes an upper scoring die 46 which also has a V-shaped scoring knife-edge 48 which is in vertical alignment with the lower scoring knife-edge 42.

As the upper die section 16 is moved downwardly toward the lower die section 14, the knife-edge 48 of the upper scoring die 46 contacts the upper or coated surface of the bearing strip 24 while knife-edge 42 of the lower scoring die member 40 is in contact with the backing material of the bearing strip 24. As the upper die section 16 moves to the end of its stroke, substantially V-shaped, vertically aligned, transverse score lines or grooves 50 and 51 are formed in the upper and lower surfaces, respectively, of the bearing strip 24.

As the upper and lower scoring knives 48 and 42, respectively, move inwardly into the bearing strip 24, in the formation of the grooves 50 and 51, the material from these grooves is displaced. In order to distribute the material displaced over an extended portion, of what will later be seen to be the effective width of the sleeve bearing, the upper and lower die members 46 and 40, respectively, are provided with faces 52 and 54, respectively (FIGURES 7 and 11), which taper in a direction away from the direction in which the associated knife edges extend. The tapered faces 52 and 54 extend for only a portion of the width of the sleeve bearing and eventually blend into a straight surface. By tapering these surfaces a relief is provided whereby the material displaced from the grooves 50, 51 can flow and be distributed over a greater portion of the surface of adjacent secured blanks on the bearing strip material 24. FIGURE 7 is a blown-up view showing the taper (exaggerated for purposes of clarity) of the surfaces 52 and 54 of the upper and lower scoring die members 46 and 40, respectively. The upper die section 16 is moved downwardly, pressing the faces 52 and 54 under considerable pressure against opposite sides of adjacent secured blanks of the strip material 24 until the material displaced in the formation of the grooves 50, 51 is completely distributed over an extended portion of the adjacent secured blanks of the bearing strip 24 on opposite sides of the grooves 50 and 51.

Thus, at the second stage, score marks or grooves are formed in the upper and lower surfaces at each end of the width of the secured blank 24(1) of the bearing strip 24 to form thereby the secured blanks 24(2) (FIGURE 2). The centers of the grooves 50 and 51 define the extremities of what will be seen to be adjacent free blanks from which individual sleeve bearings are formed.

As will be seen, adjacent, connected sides of each of the grooves 50 and 51 eventually define chamfered ends at the width of the formed bearing with the sides of grooves 50 defining the inside diameter chamfer and with the sides of groove 51 defining the outside diameter chamfer. The I.D. chamfer provides clearance for fillets (crankshaft journal), etc., while the O.D. chamfer eliminates rough edges. Often in practice the I.D. and O.D. chamfers are at different angles. This can be provided simply by changing the included angle defined by the V-grooves 50 and 51.

In order to provide that the bearing strip material 24 is maintained in proper alignment as it is being fed through Stages I and II of the die 15, a pair of guide blocks 56 (FIGURES 3 and 12) are secured to the upper surface 27 of the lower stamp block member 28 and to the upper surface 43 of lower scoring die assembly 38. The guide blocks 56 have their lower portions spaced a distance substantially equal to the transverse length of the secured blanks 24(1) and 24(2) and have upper flange portions which extend towards each other to slightly overlap the bearing strip 24. Thus the strip 24 is vertically restrained and also is longitudinally guided. The upper stamp block 34 and the upper scoring die assembly 46 of the first and second stages 26 and 36, respectively, are of a transverse width to pass between the guide strips 56 and to move into contact with the bearing strip 24.

*Stage III.—Trimming to length*

The bearing strip The bearing strip 24 as it is moved through the multiple stage die assembly 15 is moved to the third stage generally indicated by the numeral 58. In the third stage 58 the secured blank portions 24(2) of the bearing strip material 24 are trimmed on opposite sides to the proper transverse length. A lower trim block assembly 60 (FIGURES 1, 3 and 13) is secured to the lower die section 14 and includes a pair of spaced, upwardly extending stop or locating block members 62 disposed on opposite transverse sides and forwardly of a flat upper surface 68 on the assembly 60. The flat surface 68 is substantially in the same plane as the upper surface 43 of the lower scoring die assembly 38 and the upper surface 27 of the lower stamp block member 28. The locating blocks 62 are transversely spaced at their inner ends a distance less than the transverse length of secured blank portions 24(2). As the bearing strip material 24 is fed into the die assembly 15 and through the guide members 56, the leading secured blank portion 24(2) is moved into abutting contact with the locating block member 62 to thereby properly locate that blank portion 24(2) over the upper surface 68 and to a position in line with an upper break or trim assembly 64 (FIGURE 4). At the same time, an unworked portion of strip 24 and a secured blank portion 24(1) of the bearing strip 24 are also thereby properly located at the first and second stages, respectively, since the members of these stages are located a preselected distance from the stop members 62. The upper trim or break assembly 64 is secured to the upper movable die section 16 and includes a pair of spaced break members 66 which extend downwardly of the assembly 64 and are movable into contact with the transversely, opposite end portions of the secured blank portions 24(2) of the bearing strip 24. The bearing strip 24 is supported upon the flat surface 68 on the lower trim block assembly 60 (FIGURE 13) which is of a transverse dimension substantially equal to the distance between the inner edges of break members 66 whereby the latter can be moved downwardly past the surface 68 on opposite sides thereof. This transverse dimension across the face 68 is less than the transverse dimension of the secured blank portion 24(2) of the bearing strip 24; thus, upon movement of the break members 66 downwardly past the surface 68, the secured blank portion 24(2) of the strip material 24 is trimmed to the transverse dimension of the surface 68.

Looking now to FIGURE 3, the longitudinal distance between the rearward or locating face of the stop members 62 and the beginning of the surface 68 is substantially equal to the distance between the centers of consecutive grooves 50 and 51 and hence substantially equal to the width of the sleeve bearing member to be formed. Thus it can be seen in FIGURE 2 that the secured blank portion 24(2) of the bearing strip 24 is trimmed to a preselected transverse length over a width substantially equal to the distance between the centers of the consecutive ones of grooves 50 and 51 to form thereby the secured blank portions 24(3) (FIGURE 2).

A pair of blocks 70 each having a downwardly inclined surface 72 thereon are secured on opposite sides relative to the surface 68 (FIGURES 3 and 13) such that the portions of the bearing strip 24 which are broken away move down the inclined surface 72 and are directed out of the path of the break member 66.

Secured to and movable with the upper break assembly 64 is a pressure pad 74 (FIGURES 1, 4 and 13) which is urged downwardly by four spaced spring members 76 and which has a countersunk throughbore 75 serving a purpose to be seen. The pressure pad 74 engages the upper surface of the secured blank portion 24(2) and applies a force thereto to hold the blank portion 24(2) during the trimming operation.

A circular punch member 78 is secured to and extends downwardly from the upper break assembly 64 and is in vertical alignment with the throughbore 75 in the pressure pad 74. A cavity 80 is located in the surface 68 on the lower break block assembly 60 and has a hardened annular insert 81 disposed therein such that the punch member 78 can extend thereinto while punching a circular hole through that secured blank portion 24(2) of the bearing strip 24 which is located thereunder. An enlarged ejection aperture 82 is in communication with the aperture through the insert 81 in cavity 80 and extends through the lower break die 60 whereby the punched out portions can be ejected to prevent interference with the punch 78.

Thus, in the trim stage, the secured blank portions 24(2) of the bearing strip 24 are trimmed to the proper length and the oil or dowel hole is punched.

The secured blank portions 24(3) of the bearing strip 24 on leaving the third stage are still integral with the bearing strip 24 and can pass between and are guided longitudinally by the inner surfaces of locating blocks 62. Upon raising the upper die section 16, the bearing strip 24 is then moved into the fourth stage in which each secured blank portion 24(3) is sheared along the center of the grooves 50 and 51 to form a free blank having the proper width.

*Stage IV.—Forming the free blank*

In the fourth stage, generally indicated by the numeral 86, the secured blank portions 24(3) are sheared from the bearing strip 24 to form a free blank.

The secured blank portions 24(3) are fed along a flat upper surface 88 (FIGURE 1) of a lower cutting die member 90 which surface is generally in the same plane as the flat surface 68 of the break assembly 60, the upper surface 43 of the lower scoring die assembly 38 and the upper surface 27 of the lower stamp block member 28. The lower cutting die assembly 90 terminates at its rearward end in an upwardly and transversely extending cutting knife edge 92 (FIGURE 10). The cutting knife edge 92 is of a shape substantially identical to the shape of the rearward half of the lower groove 51 (FIGURE 10). Secured to the upper die section 16 is an upper cutting die assembly 94 which terminates at its forward edge in a transversely extending cutting knife edge 96. Both knife edges 92 and 96 extend transversely for a distance at least equal to the length of the secured blank portions 24(3). The knife edge 96 is of a contour substantially identical with the forward half of the groove 50 and is located to be just slightly offset from the rear surface of the lower cutting 90 such that the knife edge 96 can freely be moved downwardly past the lower knife edge 92. As the bearing strip 24 is moved into the die 15, the secured blank portion 24(2) of the bearing strip 24 is moved forward until, as previously mentioned, it abuts against the stop block 62; with the strip 24 so positioned the lower knife 92 is matably located within the rearward half of lower groove 51 of the secured blank portion 24(3) to be sheared (see FIGURE 10). Note that the bearing strip 24 is substantially seated on the surface 88. The cutting cutting knife edge 96 extends downwardly from the upper cutting die assembly 94 and engages the forward half of the upper groove 50. The knife edge 96 extends downwardly from the bottom surface 98 of the upper cutting die member 94 a distance such that with the knife edge 96 disposed in the upper groove 50 the surface 98 does not contact the secured blank portion 24(3) which is to be sheared from the bearing strip 24. The clearance between surface 98 and the secured blank portion 24(3) insures that the secured blank portion 24(3) will be sheared by the knife edges 96 and 92 and not broken by the downward force at the surface 98. By shearing instead of breaking, a substantially finished edge is provided.

While the shape of cutting knife edges 92 and 96 have been described relative to the associated grooves 50, 51 respectively, it should be apparent that they have the same relationship to the scoring knife edges 48, 42 respectively.

The secured blank portion 24(3) which is to be sheared is completely unsupported on its bottom surface. After it has been sheared by the action of the knives 96 and 92 (see FIGURE 2), the newly formed free blank 24(4) is free to be moved downwardly by the downward movement of the bottom surface 98 of the upper cutter member 94. Directly underneath the upper die member 94 and secured on the lower die section 14 are a pair of movable guide members 100 (FIGURES 3 and 5). Each of the guide members 100 has a flange portion 102 which is slidably disposed within one of a pair of slots 104 each of which is located within one of a pair of transversely spaced block members 106 secured to the lower die section 14. The flange portions 102 are less in width than the width of the slots 104, thus allowing the guide members 100 to be moved toward and away from each other within the slots 104. Each of the movable guide members 100 is spring-urged toward the other and toward the inner end of the slots 104 by springs 107. Each guide member 100 has on its innermost end an inclined surface portion 108. As the upper cutter member 94 is moved downwardly it causes the secured blank portion 24(3) to be sheared, causing it to move downwardly toward the slidable jaw or guide members 100. On further movement downwardly the ends of the upper cutter member 94 engage the inclined surfaces 108 of the jaws 100 causing these jaws to be moved outwardly away from each other against the force of their respective springs 107, thereby allowing the now free blank 24(4) to be moved downwardly therebetween and deposited upon the upper surfaces 111 of the spaced block members 106. The upper cutter member 94 has disposed in its lower surface 98 a pair of ejecting pins 109 each of which is spring urged downwardly beyond surface 98. As the upper die section 16 and hence as the upper cutter member 94 is moved upwardly the ejection pins 109 prevent the free blank 24(4) from adhering to the surface 98 and moving upwardly therewith.

A pair of guide blocks 84 are secured at opposite transverse sides of the lower cutter assembly 90 and project inwardly toward each other (guide block 56 of FIGURE 12 depicts a similar structure) to partially overlap the secured blank portion 24(3) next to be severed from the strip 24 such that as the upper cutter member 94 is moved upwardly it cannot carry upwardly with it the next blank portion 24(3) to be severed.

As the upper cutter member 94 is moved upwardly beyond the jaws 100, the jaws 100 move inwardly toward each other and securely grip the newly formed free blank member 24(4). In order to prevent the free blank member 24(4) from becoming horizontally skewed as it moves between jaw members 100, a pair of downwardly extending restraining block members 110 are secured to the upper die section 16 and move downwardly therewith and project slightly downwardly beyond the bottom surface 98 of the upper cutter member 94. Thus, any tendency for the free blank 24(4) to skew horizontally as a result of the impact of the shearing operation is prevented by blocks 110 and the free blank 24(4) is held securely by the guide blocks 100 upon the surfaces 111 of the blocks 106. Each guide block 100 has a longitudinally extending recess 113 at its lower extremity whereby the free blank 24(4) is held and is vertically restrained. Each guide block 100 in turn is vertically restrained within the grooves 104 by means of flanges 115 secured to the upper surfaces of the blocks 106 to partially overlap the upper surface of the guide block 100 with which it is associated.

After the upper die member 16 has completed its set of operations and is moved upwardly, a transfer block 112 (FIGURE 1) which is slidable in between the gap between the blocks 106 has an upper shoulder 114 which engages the free blank member 24(4) carrying it to the fifth stage in which the free blank is formed into a semicircular shape. The transfer block 112 is secured to a rod 116 which is slidably disposed within a longitudinally extending bore 118 in a guide support block member 120 which is secured to the lower die section 14. The rod 116 is reciprocated within the bore 118 by means of an electrically, pneumatically, or hydraulically operated reciprocating mechanism 122 which is actuated by means known in the art to cause reciprocation of the rod 116, and hence to the transfer block 112, responsively to an upward movement of the upper die member 16. Thus the free blank member 24(4) is moved to the next or fifth stage.

*Stage V.—Semicircularly forming the free blank*

The transfer block 112 moves the free blank 24(4) along the surfaces 111 of the blocks 106 onto a flat surface 124 disposed on opposite sides of a cavity 136 in a lower female die member 126 in the fifth stage generally indicated by the numeral 125. The cavity 136 has a shape defining a portion of a circle greater than a semicircle. A pair of guide blocks 128, 129 (FIGURES 3 and 9) secured on the surface 124 on opposite sides of the cavity 136 transversely locate the free blank 24(4) over the cavity 136 on the surface 124. The guide blocks 128, 129 each have an arcuate guide surface 131 which overlaps the free blank 24(4) on opposite ends, thereby vertically retaining it. Each of the guide blocks 128, 129 has a stop shoulder portion 130 extending transversely toward each other and against which the free blank 24(4) is moved to thereby longitudinally locate the free blank 24(4) relative to the cavity 136. Looking now to FIGURES 3 and 9, the guide member 129 is spring urged by spring assembly 133 towards the guide member 128 which can be transversely, positionally adjusted by means of a set screw assembly 135. By properly adjusting the position of the guide member 128 via the set screw assembly 135, the guide surfaces 131 can be spaced from each other such that the free blank 24(4) is properly located over the cavity 136. The spring assembly 133 biases the guide member 129 such that the free blank 24(4) is firmly gripped between arcuate surfaces 131.

Figure 9:
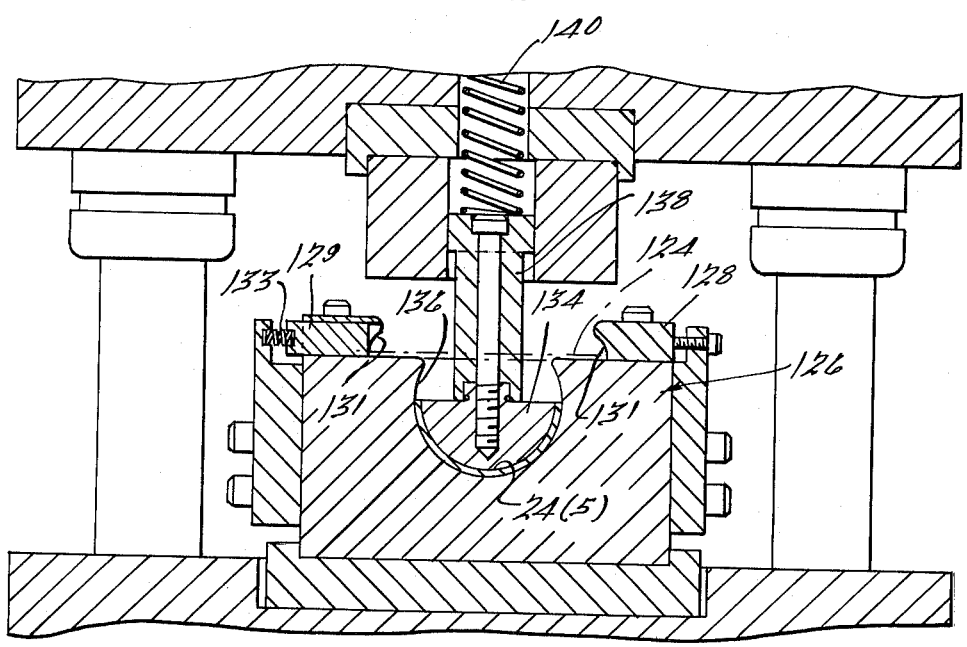
FIGURE 9 is a sectional view of the multiple stage die of FIGURE 1 taken substantially along the line 9—9 in FIGURE 1.

Located in a position directly above the female die 126 is a semicircularly shaped male die member 134. As previously mentioned, the female die cavity 136 defines a portion of a circle greater than a semicircle and has a diameter substantially equal to the outside diameter of the bearing shell to be formed. The diameter of the male die 134 is substantially equal to the inside diameter of the bearing shell to be formed and is less than the diameter of the cavity 136. Thus the linear distance across the opening of the cavity 136 can be less than its diameter as long as that dimension is greater than the diameter of the male die member 134 to allow it to pass therethrough. The male die 134 is secured to a spring-loaded rod 138 which is urged downwardly by means of the precompression on a spring member 140. By placing the male die 134 under a preload as mentioned, the load upon the free blank 24(4) can be more gradually applied with better results. As the upper die member 16 is moved downwardly, the male die member 134 contacts the upper surface of the free blank 24(4). As the downward motion continues the forces of compression of the spring 140 reaches a point at which the free blank 24(4) is moved into the cavity 136. At the completion of the downward movement of the upper die section 16 the free blank 24(4) is located completely within the cavity 136 as shown in FIGURE 9. The arcuate surfaces 131 of the guide members 128, 129 allow the ends of the free blank 24(4) to move arcuately as the blank 24(4) is moved into the cavity 136. By forming the cavity 136 to have a contour greater than a semicircle, the free blank 24(4), in order to be inserted into the cavity 136, is initially deflected an amount greater than the final position assumed. This is done to partially compensate for the tendency of the formed bearing shell to spring back and straighten out. Also by so forming the cavity 136 the male die 134 is readily stripped from the formed blank 24(5) as it is removed from the cavity 136.

Looking now to FIGURE 2, after completion of this initial forming operation the bearing shell has a substantially semicircular shape and is indicated by the numeral 24(5).

As the upper die section 16 is moved upwardly, the reciprocating mechanism 122 is actuated to move a lower projection 142 on the transfer block 112 into engagement with the formed bearing shell 24(5) and moves it into the next or sixth stage, generally indicated by the numeral 143, at which the height and the diameter of the formed shell 24(5) is coined.

*Stage VI.—Height and diameter coining*

Looking now to FIGURE 8 a female coining block member 144 is secured to the lower die section 14 and has a die cavity 146 which has its lower extremity 148 of a semicircular shape blending into upwardly and tangentially extending straight surfaces. The diameter of the semicircular portion 148 is substantially equal to the desired outside diameter of the bearing shell to be formed and is directly in line with the cavity 136 of the female forming die 126. Upon actuation of the reciprocating mechanism 122, the lower projection 142 engages the shell 24(5) and moves it into the semicircular portion 148 of the female coining die 144.

Secured to the upper die member 16 directly above the cavity 146 is a male coining die assembly 150 which has located at its lower extremity a backup portion 152. The transversely opposite edges 154 of backup portion 152 are curved and together define a portion of a circle having a diameter substantially equal to the inside diameter of the formed bearing shell 24(5). The backup member 152 is secured to a generally rectangularly shaped coining die 156 whose edges extend transversely beyond the opposite edges of the backup member 152 whereby the transverse distance between them is substantially equal to the outside diameter of the formed bearing shell 24(5). As the upper die section 16 is moved downwardly toward the lower die section 14 the coining die assembly 150 is moved downwardly toward the cavity 146 until the lower surface of the coining die 156 engages the edges of the formed bearing shell 24(5). As force is applied to opposite edges (which will be seen to substantially define the parting lines of the completed bearing shells) of the formed bearing shell 24(5) it is forced into the semicircular shape of the portion 148 of cavity 146 to thereby set the semicircular shape of the formed bearing shell 24(5). The backup member 154 fits snugly against the immediate inner surface of the formed bearing shell 24(5) adjacent the opposite edges thereof and prevents buckling at these edges during the coining operation. In order to prevent the formed bearing shell 24(5) from buckling at its lowermost portion, a central backup portion 158 extends longitudinally and substantially over the width of the formed bearing shell 24(5) to thereby restrain the lower portion from deforming during the coining operation. The central portion 158 is located above semicircular portion 148 just sufficiently to accept the formed bearing shell 24(5) and has its leading edge tapered to assure that no damage will be caused to the formed bearing shell 24(5) as it is moved into the cavity portion 148 by the transfer block 112. Upon completion of the coining operation, the coined bearing has a set semicircular shape and is indicated by the numeral 24(6).

If a formed shell member 24(5) out of the forming operation of the fifth stage were removed from the die cavity 136, the member 24(5) would spring back and no longer have a true semicircular shape. By coining the formed shell member 24(5) they are further deformed to permanently have a more exact semicircular shape.

The central portion 158 is a portion of a restraining block member 160 which is located in the seventh and final stage of the multiple stage die member 15; in the seventh stage, generally indicated by the numeral 161, the locating lip is formed.

*Stage VII.—Formation of locating lip*

As the upper die member 14 is moved upwardly after the completion of its plurality of operations, the reciprocating mechanism 122 is actuated to cause the transfer block 112 to be reciprocated such that the projection 142 engages the semicircularly formed shell member 24(5) in the fifth stage, moving that shell into the cavity 146 of the sixth stage and thence moving it into abutment with the newly coined bearing shell member 24(6) and thereby moving the coined shell member 24(6) into a semicircularly shaped cavity 162 (FIGURE 6) which is of a diameter substantially equal to the outside diameter of the coined bearing shell member 24(6). The cavity 162 is disposed in a lower lipping block member 164 which is secured to the lower die section 14 and is in line with the cavity portion 148 of the coining die 144 and in line with the cavity 136 of the forming die 126. In the preferred embodiment the die block member 112 actually moves the formed bearing shell 24(5) and the coined bearing shell 24(6) an extent such that the newly coined bearing shell 24(6) transferred to the seventh stage initially extends slightly beyond the end of the cavity 162 for a purpose to be seen.

As disposed relative to the cavity 162, the restraining member 160 has a cross member 161 which substantially overlays the opening of the top portion of the cavity 162 such that the edges of the newly coined bearing shell member 24(6) disposed therein are proximate to the lower surface of the cross member 161. The center backup portion 158 is attached to the cross member 161 and extends downwardly therefrom into the cavity 162 of the lipping block member 164 and into the cavity 146 of the coining block 144 and thus backs up the lower portion of the coined bearing shell member 24(6) during the lipping operation (see FIGURE 6). The cross member 161 substantially covering the cavity 162 has a slot (see FIGURES 3 and 6) 166 whereby a portion of the cavity 162 is exposed from above. The cavity 162 on the same side as the location of the slot 166 has an outwardly extending recess 168 (FIGURE 6). A locating member 170 (FIGURE 1) is secured to the upper die section 16 and extends downwardly therefrom and terminates at its lower end in a chamfer 172 such that as the upper die section 16 is moved downwardly the chamfered surface 172 contacts the coined bearing shell member 24(6) which is initially extending beyond the cavity 162 to be moved rearwardly into the cavity 162 and to be properly positioned therein. Since the coined bearing shell member 24(6) is in contact with a formed shell member 24(5) in the coining stage, this shell member 24(5) is also moved rearwardly and positioned within the cavity 146. The locating member 170 extends downwardly sufficiently such that the location of the shell members 24(5) and 24(6) occurs prior to the coining and lipping operations.

A lipping member 174 is secured to the upper die section 16 and extends downwardly therefrom directly above the slot 166 and has an inclined lipping surface 176 at its lower edge which is matable within the recess 168 in cavity 162. As the lipping member 174 moves downwardly its lower edge extends through the slot 166 in the cross member 161 and the lipping surface 176 contacts the edge of the coined bearing shell member 24(6) moving that portion into the recess 168 to thereby form a bearing shell member having a lip thereon as generally indicated by the numeral 24(7) (FIGURES 2 and 6). The cross member 161 prevents rotation of the coined bearing shell 24(6) within the cavity 162 while the center backup portion 158 prevents buckling of the lower portion of the coined shell 24(6) during the lipping operation.

In the embodiment described above and shown in the drawings the lip is formed at one edge along the parting line of the coined bearing shell member 24(6). The lip could be formed at some other location along the parting line; alternatively, lips could be formed at desired locations along the parting lines on opposite ends of the coined shell 24(6). The parting lines, of course, are defined by those surfaces of each shell member which are in abutment with similar surfaces of a mating shell member upon the assembly of the completed bearing.

As the upper die member 16 is moved upwardly at the completion of its series of operations at the various stages, the reciprocating member 122 is actuated to cause the transfer block 112 to be moved such that the projection 142 engages the newly semicircularly formed bearing shell 24(5) causing it to be moved from the fifth stage into the sixth stage, whereupon the newly coined bearing shell member 24(6) is moved from the sixth into the seventh stage, whereupon the newly lipped member 24(7) is ejected from that end of the die assembly 15. The lipped bearing shell member 24(7) can be ejected since the locating member 170 secured to the upper die section 16 has been moved from the end of the cavity 162.

As previously mentioned in the discussion of the second stage at which the bearing material 24 was scored, the upper and lower die members 46 and 40 were provided with surfaces 52 and 54, respectively, which taper in a direction away from the direction in which the associated knife edges extend. If the surfaces 52 and 54 were formed flat and the material displaced in the formation of grooves 50 and 51 was not allowed to become distributed over an extended portion of the blank adjacent the grooves 50 and 51, then upon formation of a bearing shell having a semicircular shape, as previously described, there would be a tendency for warping to occur over the width of the bearing shell. This tends to occur since, if the flow of material is confined, the material is work-hardened considerably more at, what eventually proves to be, the edges of the bearing shells than at the center portion. Thus forming the shell 24(5) from a free blank 24(4), for the same amount of deformation, the outer edges would take a smaller permanent set than the center portion and hence would tend to spring back more to the original shape; the center portion having a lesser hardness for the same amount of deformation, would tend to take a greater amount of permanent set and hence tend to spring back a lesser amount. The result would be a warped contour over the width of the bearing shell. By providing the relief or the tapered surface as exemplified in FIGURE 7, the material in the formation of the grooves 50 and 51 is distributed over a greater portion of the blanks thereby more evenly distributing the work hardening and thus either minimizing or eliminating the differential in permanent set across the width of the semicircularly formed bearing shell.

As previously noted, the grooves 50 and 51 are V-shaped and the associated cutting knife edges 96 and 92, respectively, are of a shape to fit matably within one-half of those grooves. Upon completion of the shearing operation along the center of the grooves 50 and 51 the inclined edges of each half of grooves 50 and 51 form thereby the upper and lower chamfered surfaces for the finally formed bearing. Chamfered surfaces were conventionally formed by a separate machining operation; by thus forming the chamfered surfaces in the method described, this operation is completely eliminated and hence any chance for damage to the parts in transfer, alignment, etc., is eliminated.

A sensing device 176 of a form well-known in the art is actuated by a member 178 secured to the upper die section 16 such that as the upper die section moves upwardly after completing its plurality of operations, the device 176 is actuated to thereby actuate the feed mechanism 22 to cause the bearing strip 24 to be automatically fed into the die 15 and cause the reciprocating mechanism 122 to be actuated to thereby move the free blanks in the manner previously described. Additional devices, well-known in the art, could be utilized to cause the upper die section 16 to automatically be moved toward and away from the lower die section 14.

While it will be apparent that the preferred embodiment of the invention disclosed is well calculated to fulfill the objects above, it will be appreciated that the invention is susceptible to modification, variation and change without departing from the proper scope or fair meaning of the subjoined claims.

What is claimed is:

1. The method of making substantially semicircularly shaped sleeve bearing blanks having a preselected final width from a longitudinally extending strip of material comprising the steps of forming grooves in the strip at preselected intervals, cutting the strip along the grooves to form free blanks having the preselected final width, forming the free blanks into substantially semicircularly shaped sleeve bearing blanks locating the semicircularly shaped blanks along one edge of its width and forming a locating lip at one end, and machining the inside diameter of the semicircularly shaped blank to a high finish.

2. The method of making substantially semicircularly shaped sleeve bearing blanks from a longitudinally extending strip of material comprising the steps of forming transversely extending grooves in the upper and lower surfaces of the strip at preselected intervals to form pairs of vertically aligned grooves at these intervals, cutting the strip along the longitudinal centers of each pair of grooves to form free blanks, forming the free blanks into substantially semicircularly shaped sleeve bearing blanks, and machining the inside diameter of the semicircularly shaped blank to a high finish.

3. The method of making substantially semicircularly shaped sleeve bearing blanks from a longitudinally extending strip of material comprising the steps of forming transversely extending grooves in the upper and lower surfaces of the strip at preselected intervals to form pairs of vertically aligned, V-shaped grooves at these intervals, cutting the strip along the longitudinal centers of each pair of V-shaped grooves to form free blanks, machining the inside diameter of the semicircularly shaped blank to a high finish, and machining the semicircularly shaped blank to the proper height.

4. The method of making substantially semicircularly shaped sleeve bearing blanks from a longitudinally extending strip of material comprising the steps of forming grooves in the strip at preselected intervals, cutting the strip along the grooves to form free blanks, deforming the free blanks into a substantially semicircular shape, further deforming the free blanks to permanently have a more exact semicircular shape, and machining the inside diameter of the semicircularly shaped blank to a high finish.

5. The method of making substantially semicircularly shaped sleeve bearing blanks from a longitudinally extending strip of material comprising the steps of forming grooves in the strip at preselected intervals, trimming the strip transversely to a preselected dimension, cutting the strip along the grooves to form free blanks, deforming the free blanks into a substantially semicircular shape, further deforming the free blanks to permanently have a more exact semicircular shape, and machining the inside diameter of the semicircularly shaped blank to a high finish.

6. The method of making substantially semicircularly shaped sleeve bearing blanks from a longitudinally extending strip of material comprising the steps of forming transversely extending grooves in the upper and lower surfaces of the strip at preselected intervals to form pairs of vertically aligned grooves at these intervals, trimming the strip transversely to a preselected dimension, positioning the strip longitudinally against that portion of the strip to be trimmed, cutting the strip along the longitudinal centers of each pair of grooves to form free blanks, defroming the free blanks into a substantially semicircular shape, further deforming the free blanks to permanently have a more exact semicircular shape, and machining the inside diameter of the semicircularly shaped blank to a high finish.

7. The method of making substantially semicircularly shaped sleeve bearings from a longitudinally extending strip of material comprising the steps of forming transversely extending grooves in the upper and lower surfaces of the strip at preselected intervals to form pairs of vertically aligned grooves at these intervals, trimming the strip transversely to a preselected dimension, severing the strip along the longitudinal centers of each pair of grooves to form free blanks, deforming the free blanks into a substantially semicircular shape, further deforming the free blanks to permanently have a more exact semicircular shape, machining the inside diameter of the semicircularly shaped blank to a high finish, and machining the semicircularly shaped blank to the proper height.

8. The method of making substantially semicircularly shaped sleeve bearing blanks from a longitudinally extending strip of material comprising the steps of forming grooves in the strip at preselected intervals, trimming the strip transversely to a preselected dimension, positioning the strip longitudinally against that portion of the strip to be trimmed, cutting the strip along the grooves to form free blanks, forming the free blanks into substantially semicircularly shaped sleeve bearing blanks, and machining the inside diameter of the semicircularly shaped blank to a high finish.

9. The method of making substantially semicircularly shaped sleeve bearing blanks from a longitudinally extending strip of material comprising the steps of trimming the strip transversely to a preselected dimension, positioning the strip longitudinally against that portion of the strip to be trimmed to locate preselected longitudinal lengths of the strip for severing at a cutting stage, cutting the preselected longitudinal lengths of strip to form free blanks, forming the free blanks into substantially shaped sleeve bearing blanks, and machining the inside diameter of the semicircularly shaped blank to a high finish.

10. The method of making substantially semicircularly shaped sleeve bearing blanks having a preselected final width from a longitudinally extending strip of material comprising the steps of trimming the strip transversely to a preselected dimension, positioning the strip longitudinally against that portion of the strip to be trimmed to locate preselected longitudinal lengths of the strip for severing at a cutting stage, forming a utility hole in the transversely trimmed portion of the strip at a location determined by said positioning step, cutting the preselected longitudinal lengths of strip to form free blanks having the preselected final width, forming the free blanks into substantially semicircularly shaped sleeve bearing blanks, locating the semicircularly shape blanks along one edge of its width and forming a locating lip at one end, and machining the inside diameter of the semicircularly shaped blank to a high finish.

References Cited by the Examiner

UNITED STATES PATENTS

| | | | |
|---|---|---|---|
| 539,332 | 5/95 | Alyworth et al. | 153—2 |
| 1,131,037 | 3/15 | Cary | 29—411 |
| 1,180,728 | 4/16 | Klocke | 29—149.5 |
| 1,603,488 | 10/26 | Myers | 29—149.5 |
| 1,748,038 | 2/30 | Leach | 29—149.5 |
| 1,924,230 | 8/33 | Davis | 29—149.5 |
| 2,353,925 | 7/44 | Pattison | 153—2 |
| 2,503,533 | 4/50 | Williams | 29—149.5 |

WHITMORE A. WILTZ, *Primary Examiner.*

THOMAS H. EAGER, *Examiner.*

UNITED STATES PATENT OFFICE
CERTIFICATE OF CORRECTION

Patent No. 3,206,830                                                          September 21, 1965

Kermit M. Hart et al.

It is hereby certified that error appears in the above numbered patent requiring correction and that the said Letters Patent should read as corrected below.

Column 4, line 69, for "member" read -- members --; column 6, line 20, after "cutting" insert -- assembly --; line 26, after "knife" insert -- edge --; line 30, for "cutting", first occurrence, read -- upper --; column 8, line 13, for "aboove" read -- above --; line 33, for "forces" read -- force --; column 12, line 51, for "defroming" read -- deforming --; column 14, line 7, for "shape" read -- shaped --.

Signed and sealed this 14th day of June 1966.

(SEAL)
Attest:

ERNEST W. SWIDER
Attesting Officer

EDWARD J. BRENNER
Commissioner of Patents